US008510643B2

(12) United States Patent
Zhang et al.

(10) Patent No.: US 8,510,643 B2
(45) Date of Patent: Aug. 13, 2013

(54) OPTIMIZING RAID MIGRATION PERFORMANCE

(75) Inventors: Jimmy Zhang, Fremont, CA (US); Pinshan Jiang, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 695 days.

(21) Appl. No.: 12/646,849

(22) Filed: Dec. 23, 2009

(65) Prior Publication Data

US 2011/0154167 A1 Jun. 23, 2011

(51) Int. Cl.
*G06F 11/00* (2006.01)

(52) U.S. Cl.
USPC .......................................... 714/800

(58) Field of Classification Search
USPC .................... 711/114, 169
See application file for complete search history.

(56) References Cited

U.S. PATENT DOCUMENTS

| 5,960,451 | A | * | 9/1999 | Voigt et al. | 711/114 |
| 6,958,507 | B2 | * | 10/2005 | Atwood et al. | 257/296 |
| 7,711,897 | B1 | * | 5/2010 | Chatterjee et al. | 711/114 |
| 2003/0169630 | A1 | * | 9/2003 | Hosono et al. | 365/200 |
| 2005/0066124 | A1 | * | 3/2005 | Horn et al. | 711/114 |
| 2005/0210322 | A1 | * | 9/2005 | Corrado | 714/13 |
| 2006/0112221 | A1 | * | 5/2006 | Hu et al. | 711/114 |
| 2008/0046648 | A1 | * | 2/2008 | Forhan et al. | 711/114 |
| 2009/0228648 | A1 | * | 9/2009 | Wack | 711/114 |
| 2010/0011162 | A1 | * | 1/2010 | Wang et al. | 711/114 |
| 2010/0268875 | A1 | * | 10/2010 | Sidnal et al. | 711/114 |
| 2011/0016279 | A1 | * | 1/2011 | Gillingham | 711/154 |

* cited by examiner

*Primary Examiner* — Michael Maskulinski
*Assistant Examiner* — Neil Miles (57) ABSTRACT

A method of RAID migration comprising reading first and second blocks from a first RAID array. Said first blocks are written to a second RAID array within a first write cycle. Said second blocks are read simultaneously with a portion of said first write cycle in a pipelined fashion. In a first embodiment, pipelining increases the speed of RAID migration from a one-disk stripe array to a two-disk mirror array. In a second embodiment, pipelining and the use of duplicate blocks increases the speed of RAID migration from a two-disk mirror array to a three-disk RAID 5 array. In a third embodiment, pipelining and the use of duplicate blocks increases the speed of RAID migration from a three-disk RAID 5 array to a four-disk RAID 5 array.

20 Claims, 7 Drawing Sheets

OPTIMIZING RAID MIGRATION PERFORMANCE

FIELD

Embodiments according to the present invention generally relate to data processing, in particular to RAID migration.

BACKGROUND

A redundant array of independent disks ("RAID") is a system for computer data storage that divides and replicates data among multiple hard drives. The different types of RAID systems are named by the word RAID followed by a number, as in RAID 0, RAID 1, RAID 5, etc. RAID's various designs increase data reliability and/or increase input/output performance. When multiple hard drives are set up to use RAID technology, they are said to be in a RAID array. This array distributes data across multiple disks, but the computer user sees the array as one single disk.

There are several key concepts in RAID. Mirroring is the copying of data to more than one disk. Striping is the splitting of data across more than one disk. And error correction is done where redundant data is stored to allow problems to be detected and fixed. Redundancy is achieved by either writing the same data to multiple drives (known as "mirroring"), or collecting data (known as "parity data") across the RAID array, calculated such that the failure of one or more disks in the array will not result in the loss of data. The various RAID arrays give different trade-offs of protection against data loss, capacity, and speed. RAID levels 0, 1, and 5 are the most commonly found, however other RAID arrays also exist.

RAID 0 (striped disks) distributes data across multiple disks in a way that gives improved speed at any given instant. If one disk fails, however, all of the data on the array will be lost, and there is neither parity nor mirroring. RAID 1 (mirroring) mirrors the contents of the disks, making a form of 1:1 ratio real-time backup. The contents of each disk in the array are identical to that of every other disk in the array. RAID 5 (striped disks with distributed parity) combines three or more disks in a way that protects data against the loss of any one disk. Parity information is spread across the disk array, and is used to recover lost information, for example if a single drive fails.

RAID migration is a process of converting a RAID array from one RAID type to another RAID type. For example, migrating from a RAID 0 to RAID 1, from RAID 1 to RAID 5, and from a three-disk RAID 5 array to a four-disk RAID 5 array, etc.

Figure 1:
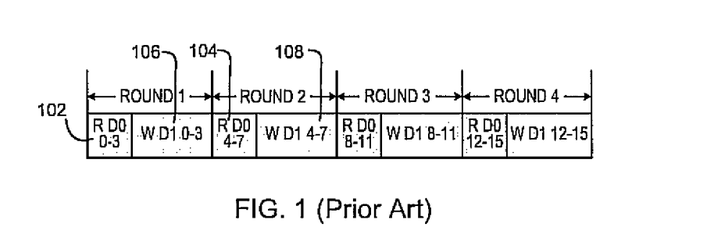
FIG. 1 is a timing diagram showing the usual sequence of migrating a one-disk stripe array to a two-disk mirror array of the prior art.

FIG. 1 (Prior Art) is a timing diagram showing the usual sequence of migrating a one-disk stripe array to a two-disk mirror array. D0 is a source Disk 0, and D1 is a destination Disk 1. R D0 0-3 means read block 0 to block 3 from Disk 0. Similarly, W D1 0-3 means write block 0 to block 3 to Disk 1.

By analyzing the operation patterns, it is seen that there are two idle periods that reduce performance. The first idle period is the time between two consecutive read operations on Disk 0, for example a first read operation 102 and a second read operation 104. The second idle period is the time between two consecutive write operations on Disk 1, for example a first write operation 106 and a second write operation 108. The cause of these idle periods is that this algorithm takes strict steps in each round, such that the read operation in the next round does not start until the write operation in the previous round is complete. By performing in this manner, only a very small memory is required as the read data is immediately written in the next process. Unfortunately, performance is relatively slow.

SUMMARY

According to embodiments of the present invention, pipelining is used to increase the speed of RAID migration. In addition, duplicate blocks are used along with pipelining to increase the speed and safety of RAID migration.

In a first embodiment, pipelining increases the speed of RAID migration from a one-disk stripe array to a two-disk mirror array. Read operations occur in a pipelined fashion within rounds. In other words, read operations and write operations occur simultaneously, and the pipeline depth can be a user tunable parameter, depending on the amount of memory resources available.

In a second embodiment, pipelining and the use of duplicate blocks increases the speed of RAID migration from a two-disk mirror array to a three-disk RAID 5 array. Duplicate blocks are created during RAID migration. Furthermore as rounds progress, the availability of duplicate blocks increases. The RAID migration speed is increased by pipelining the duplicate blocks to safely transfer increasing amounts of information simultaneously. Factors such as stripe size, maximum memory, and the maximum sustainable disk performance are considered to set the usable number of duplicate blocks.

In a third embodiment, pipelining and the use of duplicate blocks increases the speed of RAID migration from a three-disk RAID 5 array to a four-disk RAID 5 array. As RAID migration progresses, duplicate blocks are created, and the number of duplicate blocks increases from round to round. Pipelining increases the RAID migration speed by using the duplicate blocks to safely transfer increasing amounts of information. The duplicate blocks that are used can be limited, or factors such as stripe size, maximum memory, and the maximum sustainable disk performance can be used to increase the number of duplicate blocks used.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data within a computer system. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

System Platform

Figure 2:
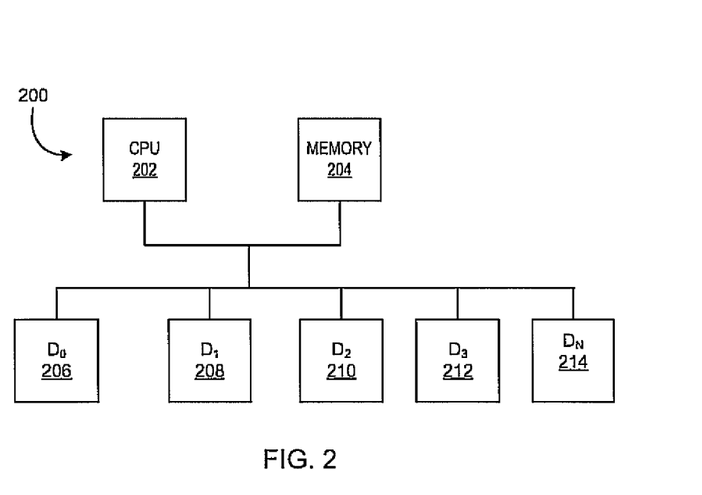
FIG. 2 is a block diagram of a system within which a RAID migration in accordance with the embodiments of present invention can be used.

FIG. 2 is a block diagram of an example of a computer system 200 within which a RAID migration procedure in accordance with an embodiment of the present invention can be used. In the example of FIG. 2, the system 200 includes a host central processing unit (CPU) 202 coupled to a computer memory 204. Instructions are stored within the memory 204, that when executed, perform functions. Both the CPU 202 and the memory 204 are connected to a first drive 206, and a second drive 208. A third drive 210, a fourth drive 212, and any number of more drives 214 may also be connected.

Generally speaking, the system 200 includes the basic components of a computer system platform that implements functionality in accordance with embodiments of the present invention. The system 200 can be implemented as, for example, any of a number of different types of computer systems (e.g., servers, laptops, desktops, game consoles, notebooks, etc.), as well as any other system that uses hard drives.

First Embodiment

Figure 3:
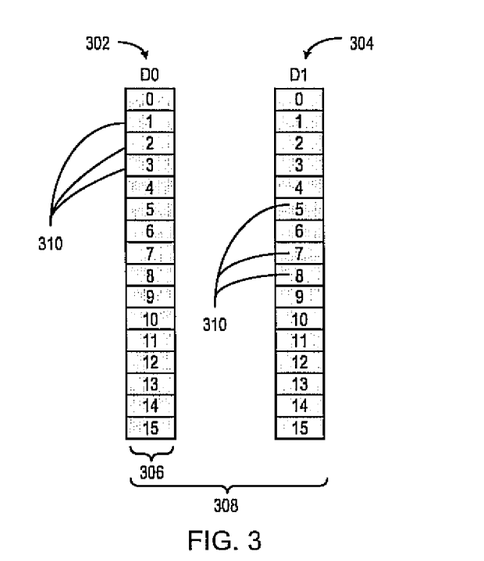
FIG. 3 is a diagram showing $D_0$ and $D_1$ or a RAID array according to an embodiment of the present invention.

FIG. 3 is a diagram showing disks $D_0$ 302 and $D_1$ 304 according to an embodiment of the present invention. The $D_0$ 302 is an existing one-disk stripe array 306. The $D_0$ 302 and the $D_1$ 304 are a planned two-disk mirror array 308. The $D_0$ 302 and the $D_1$ 304 have blocks 310. The blocks 310 are numbered from 0 to 15, however there may be any number of blocks 310, corresponding to the size of the $D_0$ 302 and the $D_1$ 304.

Figure 4:
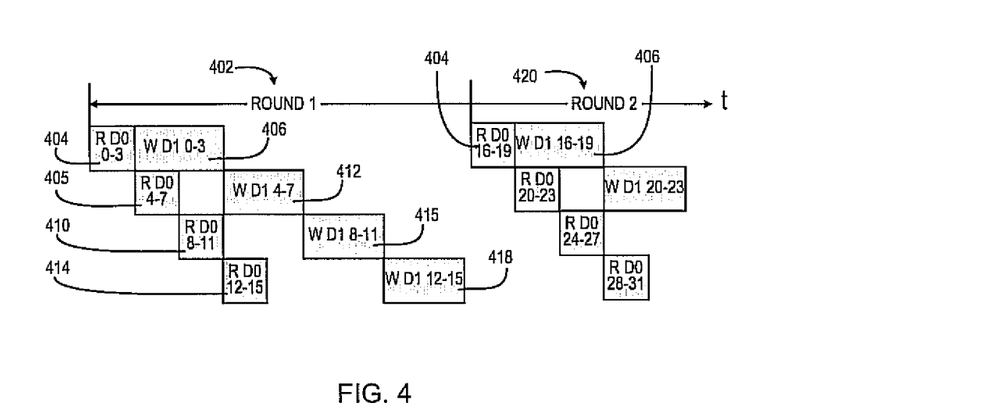
FIG. 4 is a timing diagram showing the sequence of migrating a one-disk stripe array to a two-disk mirror array according to an embodiment of the present invention.

FIG. 4 is a timing diagram showing the time sequence of migrating the existing one-disk stripe array 306 (FIG. 3) to the planned two-disk mirror array 308 (FIG. 3) according to an embodiment of the present invention. The embodiments of the present invention use pipelining to increase the speed of RAID migration procedures. In other words, certain read operations are allowed to be performed simultaneously with certain write operations to thereby reduce the overall migration time. As a result, more memory is used as read data is stored awaiting its write cycle. Alternate embodiments include, but are not limited to, RAID rebuild and RAID sync operations.

A first round 402 begins with a first read operation 404. During the first read operation 404, four of the blocks 310 (FIG. 3) numbered 0 to 3 are read from the one-disk stripe array 306 (FIG. 3). After the first read operation 404, a first write operation 406 writes the blocks 310 (FIG. 3) numbered 0 to 3 to the two-disk mirror array 304 (FIG. 3). It is assumed in this embodiment that the write operation takes longer than the read operation for a block size of equal length.

In a second read operation 408, four of the blocks 310 (FIG. 3) numbered 4 to 7 are read from the one-disk stripe array 306 (FIG. 3). The second read operation 408 begins with substantially no delay after the first read operation 404. Similarly, in a third read operation 410, four of the blocks 310 (FIG. 3) numbered 8 to 11 are read from the one-disk stripe array 306 (FIG. 3). The third read operation 410 begins with substantially no delay after the second read operation 408. Finally, in a fourth read operation 414, four of the blocks 310 (FIG. 3) numbered 12 to 15 are read from the one-disk stripe array 306 (FIG. 3). The fourth read operation 414 begins with substantially no delay after the third read operation 410. Read data not written to disk is stored in memory.

After the first write operation 406, a second write operation 412 writes the blocks 310 (FIG. 3) numbered 4 to 7 from the second read operation 408 to the two-disk mirror array 304 (FIG. 3). The second write operation 412 begins with substantially no delay after the first write operation 406. Similarly after the second write operation 412, a third write operation 416 writes the blocks 310 (FIG. 3) numbered 8 to 11 from the third read operation 410 to the two-disk mirror array 304 (FIG. 3). The third write operation 416 begins with substantially no delay after the second write operation 412. Finally, after the third write operation 416, a fourth write operation 418 writes the blocks 310 (FIG. 3) numbered 12 to 15 from the fourth read operation 414 to the two-disk mirror array 304 (FIG. 3). The fourth write operation 418 begins with substantially no delay after the third write operation 416.

Therefore, the second read operation 408, the third read operation 410, and the fourth read operation 414 occur in a pipelined fashion with each other and independently of the write operations.

In the current embodiment, the writing operations take more time than the reading operations. Thus, time is saved for second read operation 408, third read operation 410, and fourth read operation 414. However, in an alternate embodiment, if the reading operations took more time than the writing operations, time is saved for first write operation 406, second write operation 412, and third write operation 416. In addition in an alternate embodiment, if the read operations and the write operations take the same time, then time is saved for second read operation 408, third read operation 410, fourth read operation 414, first write operation 406, second write operation 412, and third write operation 416. Finally in another alternate embodiment, time is saved by increasing the number of read operations and write operations in a round.

In one exemplary embodiment, the blocks 310 (FIG. 3) are 64K in size, four of the blocks 310 (FIG. 3) are being read into the memory 204 (FIG. 2) per read operation, and four read operations are occurring per round. Therefore in this embodiment, the memory 204 (FIG. 2) required is (64K*4*4) =1024K, or commonly called 1M (e.g. one megabyte). However in alternate embodiments, any size of block, any number of read or write operations per round, and any number of rounds may be used.

The amount of information being copied per round is called the pipeline depth. The pipeline depth is influenced by the size of the blocks 310 (FIG. 3), the amount of the memory 204 (FIG. 2), the amount of the memory 204 (FIG. 2) being allocated by a RAID driver, and the maximum sustainable performance of the drives. In alternate embodiments, the pipeline depth is a user tunable parameter, for example a performance percentage number, which may be set by a tool, for example a RAID management tool. Users could change the pipeline depth during run-time in order to change migration performance.

An exemplary performance gain for migrating the one-disk stripe array 306 (FIG. 3) to the two-disk mirror array 308 (FIG. 3), according to the embodiments is presented below. If N is number of block groups, X is the time for a read operation, and MX is the time for a write operation, then the total time to finish one round of operation is T_fast=X+NMX. In contrast, if block groups were run sequentially and one block group did not start until a prior block group had completed, then the total time for the same amount of work would be T_slow=N(X+MX). Thus the performance improvement percentage is (T_slow_T_fast)/T_slow=(N−1)/(NM+N). In a likely scenario, the write performance is close to the read performance, and the performance gain would be 50%.

Second Embodiment

Figure 5:
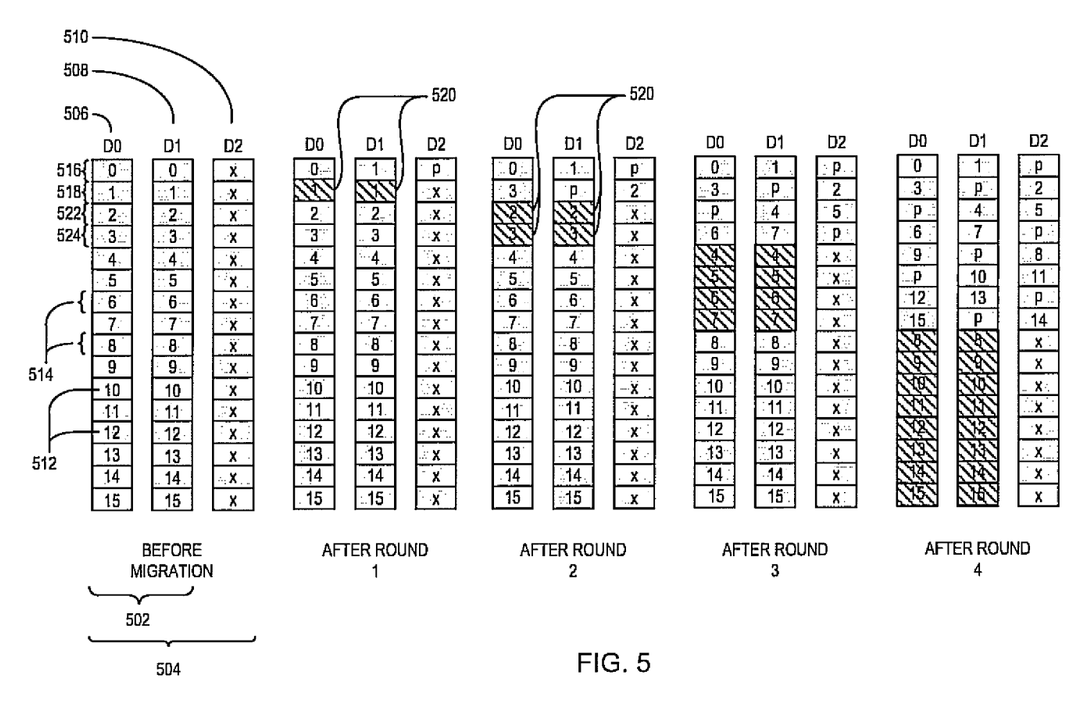
FIG. 5 is a diagram showing the sequence of migrating a two-disk mirror array to a three-disk RAID 5 array, according to an embodiment of the present invention.

FIG. 5 is a diagram showing the sequence of migrating a first RAID array 502, for example a two-disk mirror array, to a second RAID array 504, for example a three-disk RAID 5 array, according to another embodiment of the present invention. Alternate embodiments include migration from any multi-disk RAID array to another multi-disk RAID array. The first or existing RAID array 502 includes $D_0$ 506 and $D_1$ 508. The second or planned RAID array 504 includes $D_0$ 506, $D_1$ 508, and $D_2$ 510 (empty, "x"). The disks include blocks 512, and each row of the blocks 512 is a stripe 514. Thus before migration, a first stripe 516 comprises blocks 0, 0, and x.

During round 1, two of the blocks 512 numbered 1 are read from the first RAID array 502, and written to the second RAID array 504 in the first stripe 516. In addition, a parity block ("p") is calculated and written to the first stripe 516 of the second RAID array 504. The blocks 512 numbered 1 are stored in memory until after they are written to the second RAID array 504.

Thus in the current embodiment, after round 1, the first stripe 516 comprises blocks 0, 1, and p. A second stripe 518 now has duplicate blocks 520, represented by dashed blocks. The duplicate blocks 520 are now free to be overwritten, because the block data 1 is now safely copied to the first stripe 516. Therefore, either success or failure on subsequent write operations at the duplicate block 520 locations will not affect retrieval of the data originally located at these locations.

During round 2, four of the blocks 512 numbered 2 and 3 are read from the first RAID array 502, and written to the second RAID array 504 in the second stripe 518. In addition, a parity block ("p") is calculated and written to the second stripe 518. Thus, after round 2, the second stripe 518 comprises blocks 3, p, and 2. A third stripe 522 and a fourth stripe 524 now have duplicate blocks 520.

As can be seen, the duplicate blocks 520 increase linearly as rounds of operation complete. Thus, eight of the duplicate blocks 520 are free to be overwritten after three rounds of migration, and sixteen of the duplicate blocks 520 are free to be overwritten after four rounds of migration.

By taking advantage of the duplicate blocks 520 that are free to be overwritten, RAID migration speed can be increased via read/write pipelining. The number of the stripes that can be written in any given round will exponentially increase, e.g. starting from round 2, the number of the stripes that can be written will be $2^{(n-1)}$, where n≧2. In the current embodiment, the number of stripes is limited to 8, however alternate embodiments may select any number of stripes. The number of stripes selected considers factors such as (but not limited to), stripe size, the maximum memory allocated by the RAID driver, and the maximum sustainable disk performance.

As can be seen, RAID migration speed is also increased without risk of data loss due to interruption, for example a power failure. By only writing over the duplicate blocks 520, any data that may be lost in memory still exists on the drives and can be recovered upon migration restart.

Figure 6:
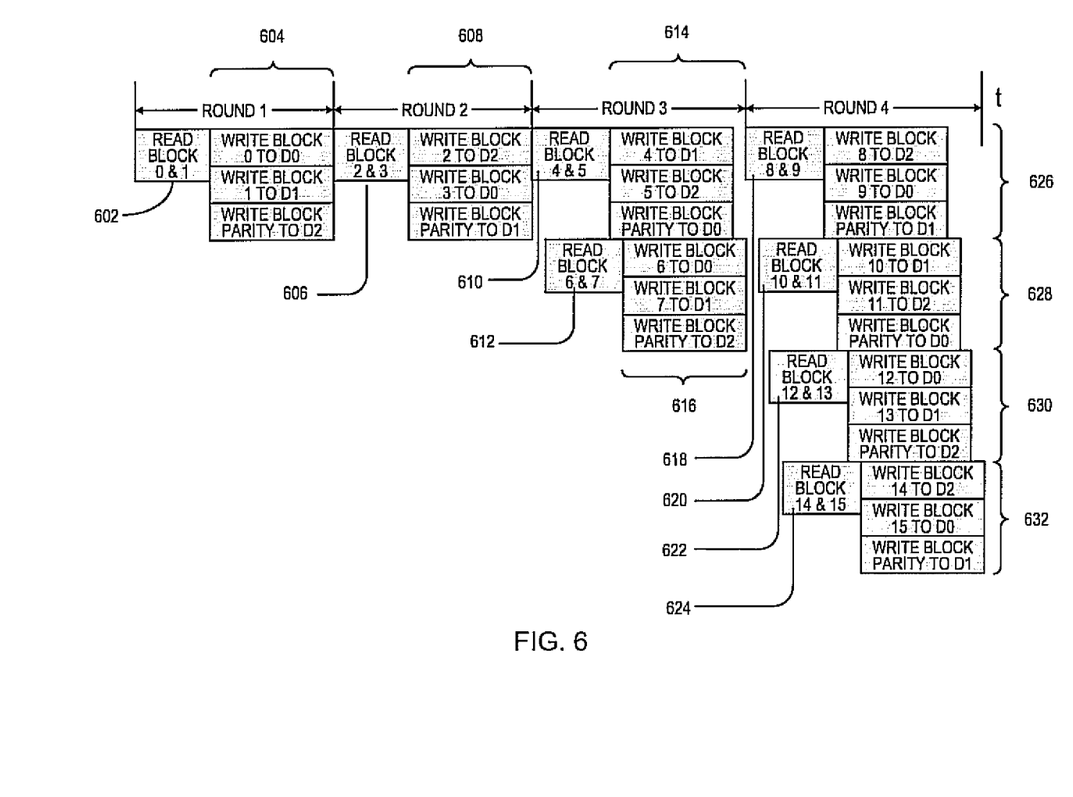
FIG. 6 is timing diagram showing the sequence of migrating a first RAID array to a second RAID array, according to an embodiment of the present invention.

FIG. 6 is a timing diagram showing in detail the sequence of migrating the first RAID array 502 (FIG. 5) to the second RAID array 504 (FIG. 5) in accordance with an embodiment of the present invention. During round 1, a first read operation 602 reads blocks 0 and 1, and a first write operation 604 writes blocks 0, 1, and p. During round 2, a second read operation 606 reads blocks 2 and 3, and a second write operation 608 writes blocks 2, 3, and p.

After round 2, subsequent rounds have multiple read operations and write operations occurring simultaneously in a pipelined fashion. Thus, during round 3 a third read operation 610 reads blocks 4 and 5, and a fourth read operation 612 reads blocks 6 and 7. These reads may overlap in time (e.g. occurring substantially simultaneously). In addition, a third write operation 614 writes blocks 4, 5, and p, and a fourth write operation 616 writes blocks 6, 7, and p. These write operations may overlap in time (e.g. occurring substantially simultaneously).

During round 4, a fifth read operation 618 reads blocks 8 and 9, a sixth read operation 620 reads blocks 10 and 11, a seventh read operation 622 reads blocks 12 and 13, and an eighth read operation 624 reads blocks 14 and 15. In addition, a fifth write operation 626 writes blocks 8, 9, and p, a sixth write operation 628 writes blocks 10, 11, and p, a seventh write operation 630 writes blocks 12, 13, and p, and an eighth write operation 632 writes blocks 14, 15, and p. As shown in round 4, the write operations and the read operations partially overlap in time (e.g. occurring simultaneously).

Performance gains are achieved by pipelining of certain read and write operations within the third and fourth rounds. Again, like the first embodiment, data that is read but not yet written to disk is stored in memory. In round 4, in one example, the process repeats. The depth of the pipeline depends, in part, on available memory resources and the pipeline depth shown in round 4 is exemplary only.

Third Embodiment

Figure 7:
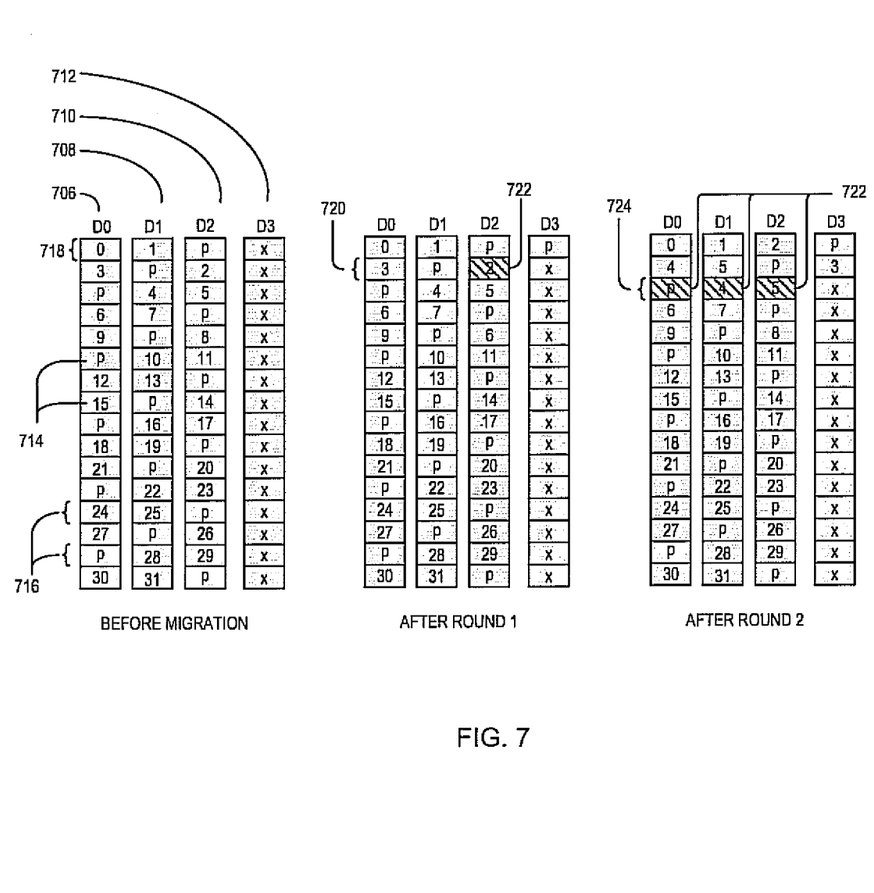
FIG. 7 is a diagram wherein the first RAID array is a three-disk RAID 5 array, and the second RAID array is a four-disk RAID 5 array, according to an embodiment of the present invention.

FIG. 7 is a diagram showing the sequence of migrating a first RAID 5 array 702, for example a three-disk RAID 5 array, to a second RAID 5 array 704, for example a four-disk RAID 5 array, according to an alternate embodiment of the present invention. The first or existing RAID 5 array 702 includes $D_0$ 706, $D_1$ 708, and $D_2$ 710. The second or planned RAID 5 array 704 includes $D_0$ 706, $D_1$ 708, $D_2$ 710, and $D_3$ 712 (empty, "x"). The disks include blocks 714, and each row of the blocks 714 is a stripe 716. Thus before migration, a first stripe 718 comprises blocks 0, 1, p, and x.

During round 1, one of the blocks 714 numbered 2 is read from the first RAID 5 array 702, and written to the second RAID 5 array 704 in the first stripe 718. In addition, a parity block ("p") is calculated and written to the first stripe 718 of the second RAID 5 array 704. The block 714 numbered 2 is stored in memory until after it is written to the second RAID 5 array 704.

Thus in the current embodiment, after round 1, the first stripe 718 comprises blocks 0, 1, 2, and p. A second stripe 720 now has a duplicate block 722, represented by a dashed block. The duplicate block 722 is now free to be overwritten, because the block data 2 is now safely copied to the first stripe 718. Therefore, either success or failure on subsequent write operations at the duplicate block 722 location will not affect retrieval of the data originally located at this location.

During round 2, three of the blocks 714 numbered 3, 4, and 5 are read from the first RAID array 702, and written to the second RAID array 704 in the second stripe 720. In addition, a parity block ("p") is calculated and written to the second stripe 720. Thus, after round 2, the second stripe 720 comprises blocks 4, 5, p, and 3. A third stripe 724 now has duplicate blocks 722.

As can be seen, the duplicate blocks 722 increase as rounds of operation complete. Thus, four of the duplicate blocks 722 are free to be overwritten after three rounds of migration, six of the duplicate blocks 722 are free to be overwritten after four rounds of migration, nine of the duplicate blocks 722 are free to be overwritten after five rounds of migration, twelve of the duplicate blocks 722 are free to be overwritten after six rounds of migration, nineteen of the duplicate blocks 722 are free to be overwritten after seven rounds of migration, and 28 of the duplicate blocks 722 are free to be overwritten after eight rounds of migration.

By taking advantage of the duplicate blocks 722 that are free to be overwritten, RAID migration speed can be increased via read/write pipelining similar to that shown in FIG. 6. In the current embodiment, the number of stripes may be limited, and alternate embodiments may select any number of stripes. The number of stripes selected considers factors such as (but not limited to), stripe size, the maximum memory allocated by the RAID driver, and the maximum sustainable disk performance.

As can be seen, RAID migration speed is also increased without risk of data loss due to interruption, for example a power failure. By only writing over the duplicate blocks 722, any data that may be lost in memory still exists on the drives and can be recovered upon migration restart.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of RAID migration comprising:
   reading first and second blocks from a first RAID array of a first RAID type;
   writing said first blocks to a second RAID array within a first write cycle, wherein said second RAID array is of a second RAID type that is different from the first RAID type; and
   wherein said second blocks are read simultaneously with a portion of said first write cycle in a pipelined fashion.

2. The method of claim 1 further comprising:
   reading third blocks from said first RAID array; and
   wherein said third blocks are read with substantially no delay after said second blocks are read.

3. The method of claim 2 further comprising:
   reading fourth blocks from said first RAID array;
   writing said second blocks to said second RAID array within a second write cycle; and
   wherein said fourth blocks are read with substantially no delay after said third blocks are read.

4. The method of claim 1 wherein said first write cycle takes more time than said first read cycle.

5. The method of claim 1 wherein said first write cycle takes substantially the same time as said first read cycle.

6. The method of claim 1 further comprising storing said first and second blocks in computer readable memory until said first and second blocks are written.

7. The method of claim 1 wherein the first RAID array is a one-disk stripe array and the second RAID array is a two-disk mirror array.

8. A method of RAID migration comprising:
   reading first blocks from a first RAID array;
   writing said first blocks to a second RAID array wherein said writing said first blocks to said second RAID array creates a first number of duplicate blocks in said first RAID array;
   reading second blocks from said first RAID array;
   writing said second blocks to said second RAID array wherein said writing said second blocks to said second RAID array overwrites at least a fraction of said first number of duplicate blocks in said first RAID array and creates a second number of duplicate blocks in said first RAID array, wherein said second number is greater than said first number;
   reading third and fourth blocks from said first RAID array in a first and second read cycle; and writing said third and fourth blocks to said second RAID array within a first and second write cycle wherein said writing said third and fourth blocks to said second RAID array overwrites at least a fraction of said second number of duplicate blocks in said first RAID array and creates a third number of duplicate blocks in said first RAID array, wherein said first and second read cycles occur substantially simultaneously, wherein said first and second write cycles occur substantially simultaneously, and wherein further said third number is greater than said second number.

9. The method of claim 8 further comprising calculating parity and wherein said writing said first, second, third, and fourth blocks further comprises writing said parity to said second RAID array.

10. The method of claim 8 further comprising performing additional read cycles and additional write cycles wherein said additional write cycles overwrite said third number of duplicate blocks in said first RAID array and created a fourth number of duplicate blocks in said first RAID array, wherein said fourth number is greater than said third number.

11. The method of claim 10 wherein said additional read cycles occur substantially simultaneously, and wherein said additional write cycles occur substantially simultaneously.

12. The method of claim 8 further comprising storing said first, second, third, and fourth blocks in computer readable memory until said first, second, third, and fourth blocks are written.

13. The method of claim 8 wherein the first RAID array is a two-disk mirror array and the second RAID array is a three-disk RAID 5 array.

14. The method of claim 8 wherein the first RAID array is a three-disk RAID 5 array and the second RAID array is a four-disk RAID 5 array.

15. A system of converting a first RAID array to a second RAID array comprising:
a processor;
memory coupled to the processor;
instructions stored within the memory that when executed cause said system perform a method comprising:
reading first blocks from a first RAID array;
writing said first blocks to a second RAID array wherein said writing said first blocks to said second RAID array creates a first number of duplicate blocks in said first RAID array;
reading second blocks from said first RAID array;
writing said second blocks to said second RAID array wherein said writing said second blocks to said second RAID array overwrites said first number of duplicate blocks in said first RAID array and creates a second number of duplicate blocks in said first RAID array, wherein said second number is greater than said first number;
reading third and fourth blocks from said first RAID array in a first and second read cycle; and
writing said third and fourth blocks to said second RAID array within a first and second write cycle wherein said writing said third and fourth blocks to said second RAID array overwrites said second number of duplicate blocks in said first RAID array and creates a third number of duplicate blocks in said first RAID array, wherein said first and second read cycles occur substantially simultaneously, wherein further said first and second write cycles occur substantially simultaneously, and wherein said third number is greater than said second number.

16. The system of claim 15 wherein said method further comprises calculating parity and wherein said writing said first, second, third, and fourth blocks further comprises writing said parity to said second RAID array.

17. The system of claim 15 wherein said method further comprises performing additional read cycles and additional write cycles wherein said additional write cycles overwrite said third number of duplicate blocks in said first RAID array and create a fourth number of duplicate blocks in said first RAID array,
wherein said fourth number is greater than said third number,
wherein said additional read cycles occur substantially simultaneously, and
wherein further said additional write cycles occur substantially simultaneously.

18. The system of claim 15 wherein said method further comprises storing said first, second, third, and fourth blocks in computer readable memory until said first, second, third, and fourth blocks are written.

19. The system of claim 15 wherein the first RAID array is a two-disk mirror array and the second RAID array is a three-disk RAID 5 array.

20. The system of claim 15 wherein the first RAID array is a three-disk RAID 5 array and the second RAID array is a four-disk RAID 5 array.

* * * * *